United States Patent [19]

Crouse

[11] Patent Number: 5,002,025

[45] Date of Patent: Mar. 26, 1991

[54] LUBRICATING OIL PERMEABLE CYLINDER WALL RING

[76] Inventor: William H. Crouse, Hound Ears Club, Blowing Rock, N.C. 28605

[21] Appl. No.: 539,718

[22] Filed: Jun. 18, 1990

[51] Int. Cl.$^5$ .............................................. F01M 1/00
[52] U.S. Cl. ........................ 123/196 M; 123/193 CP; 184/6.8; 92/155
[58] Field of Search ........ 123/196 R, 196 M, 193 CP, 123/193 R, 193 C; 184/6.8, 18; 92/155, 156, 158

[56] References Cited

U.S. PATENT DOCUMENTS

| | | | |
|---|---|---|---|
| 974,854 | 11/1910 | Boggs | 184/18 |
| 1,011,626 | 12/1911 | Judson | 184/6.8 |
| 1,288,800 | 12/1918 | Baker | 92/158 |
| 1,630,547 | 5/1927 | Tartrais | 184/18 |
| 1,632,119 | 6/1927 | Davenport | 184/18 |
| 1,643,674 | 9/1927 | Miller | 184/6.8 |
| 2,852,097 | 9/1958 | Proctor | 184/18 |
| 2,869,514 | 1/1959 | Gluss | 74/569 |
| 3,620,137 | 11/1971 | Prasse | 92/169 |
| 4,280,455 | 7/1981 | Yamaguchi et al. | 123/196 M |
| 4,280,567 | 7/1981 | Klomp | 123/196 R |
| 4,672,931 | 6/1987 | Biagini | 123/196 R |
| 4,794,896 | 1/1989 | Tsai et al. | 123/193 P |
| 4,872,432 | 10/1989 | Rao et al. | 123/193 CP |

FOREIGN PATENT DOCUMENTS

| | | | |
|---|---|---|---|
| 32917 | 2/1985 | Japan | 184/6.8 |
| 619684 | 7/1978 | U.S.S.R. | 123/196 M |
| 334968 | 9/1930 | United Kingdom | 123/196 M |

OTHER PUBLICATIONS

Degrees of Crankshaft Rotation and Piston Strokes, pp. 127, 69, 88, (no months or years provided).

*Primary Examiner*—E. Rollins Cross

[57] ABSTRACT

A lubricated cylinder wall in which an oil permeable cylinder ring is located on the inside surface of a cylinder. Oil from an oil supply channel located behind the oil permeable ring supplies the ring with oil. When the oil pressure in the oil supply channel is greater than the pressure inside the cylinder, oil is forced through the oil permeable ring and onto the inside surface of the oil permeable ring. Because the ring is located in the cylinder wall at a location above the bottom dead center location of the piston, upward motion of the piston inside the cylinder sweeps oil from the inside surface at the oil ring over the inside surface of the cylinder. The oil ring is installed in the cylinder by coiling it to a smaller diameter then the cylinder, placing the coiled ring in a groove on the inside surface of the cylinder, pressure fitting the coiled ring into the groove, and then honing the inside surface of the ring to be flush with the inside surface of the cylinder.

26 Claims, 4 Drawing Sheets 5,002,025

LUBRICATING OIL PERMEABLE CYLINDER WALL RING

FIELD OF THE INVENTION

This invention relates to a structure for lubricating the inside of a cylinder to reduce friction with a piston. More particularly, this invention relates to the use of an oil permeable annular cylinder ring for lubricating the inside cylinder wall of an internal combustion engine.

BACKGROUND OF THE INVENTION

Lubricating the inside of the cylinder wall is of major concern in the design of internal combustion engines. Conventionally, oil from the crank case is splashed up into the open cylinder. When the piston moves down in the cylinder, rings located on the piston wipe excess oil back into the crankcase from the inside wall of the cylinder. On each rotation of the crank shaft, oil is splashed up into the cylinder and the cylinder wall is lubricated.

With this technique, it has been difficult to control the amount of oil supplied to specific portions of the cylinder wall. Portions of the cylinder wall exist which experience more wear due to the piston's being forced against the wall at these points. Accordingly, it would be advantageous if special provisions could be made to provide more lubrication to these portions of the wall. Unfortunately, providing localized lubrication of the cylinder wall has been difficult using conventional lubricating methods.

Several proposals have been made in the past to lubricate cylinder walls.

U.S. Pat. No. 1,632,119 issued to Davenport is an early example. Davenport shoWs a groove in a cylinder wall which is packed with a corded packing material. The inside of Davenport's corded packing material is made to be flush with the inside of the cylinder wall. Oil, which is supplied from the backside of the corded packing material, is absorbed by the packing material and then flows onto the inside surface of the cylinder. With Davenport's packing material, oil from a reservoir is supplied to the corded packing material only at a few localized points. In order for the oil to lubricate the rest of the periphery of the cylinder wall, the oil must diffuse around the periphery of the cylinder through the corded packing material. The absence of an oil carrying channel behind the packing material, in combination with the fact that Davenport's ring is located low in the cylinder below bottom dead center (BDC), could result in poor cylinder lubrication.

U.S. Pat. No. 1,643,674 issued to Miller shows an oil ring located on the inside wall of a cylinder. Miller uses an annular oil carrying channel, however, Miller's ring involves discrete holes which lead from the oil carrying channel to specific locations inside the cylinder. These discrete holes, in combination with Miller's teaching that the oil ring is to be located below bottom dead center (BDC), may result in poor cylinder lubrication.

U.S. Pat. No. 1,630,547 issued to Tartrais shows another approach. Tartrais provides a means for supplying lubrication to the cylinder wall at a location above the bottom dead center position of the piston. Tartrais' shows discrete oil holes which lead from an oil supply into the inside of a cylinder.

SUMMARY OF THE INVENTION

The present invention provides an oil permeable and oil porous ring located on the inside of the cylinder wall. The surface of the oil porous ring is made flush with the inside wall of the cylinder. An annular oil supply channel located behind the oil permeable ring provides the backside of the oil ring with a supply of oil. Due to the permeability of the oil ring, oil from the annular oil supply channel is supplied through the ring to the inside surface of the ring. The oil ring is located at a position in the cylinder so that the piston head will be below the oil ring at the bottom of the piston stroke. Upward motion of the piston from bottom dead center (BDC) to top dead center (TDC) allows the piston to spread oil from the surface of the oil permeable ring over the inside surface of the cylinder wall.

Oil is forced through this oil permeable ring onto the inside surface of the ring by a pressure gradient across the ring. During the power stroke, high pressure exists in the cylinder. During the exhaust stroke, a low pressure exists in the cylinder. Because oil in the annular oil supply channel behind the oil permeable ring is pressurized above exhaust stroke cylinder pressure, oil floWs into the cylinder from the surface of the -il permeable ring during the low pressure exhaust stroke. Accordingly, oil is "pumped" from the oil permeable ring onto the surface of the cylinder wall at least one time each engine cycle.

BRIEF DESCRIPTION OF THE DRAWINGS

The features and advantages of the invention will be best understood when the detailed description of the preferred embodiment is read in conjunction with the following drawing.

DETAILED DESCRIPTION OF THE PREFERRED EMBODIMENT

Figure 1:
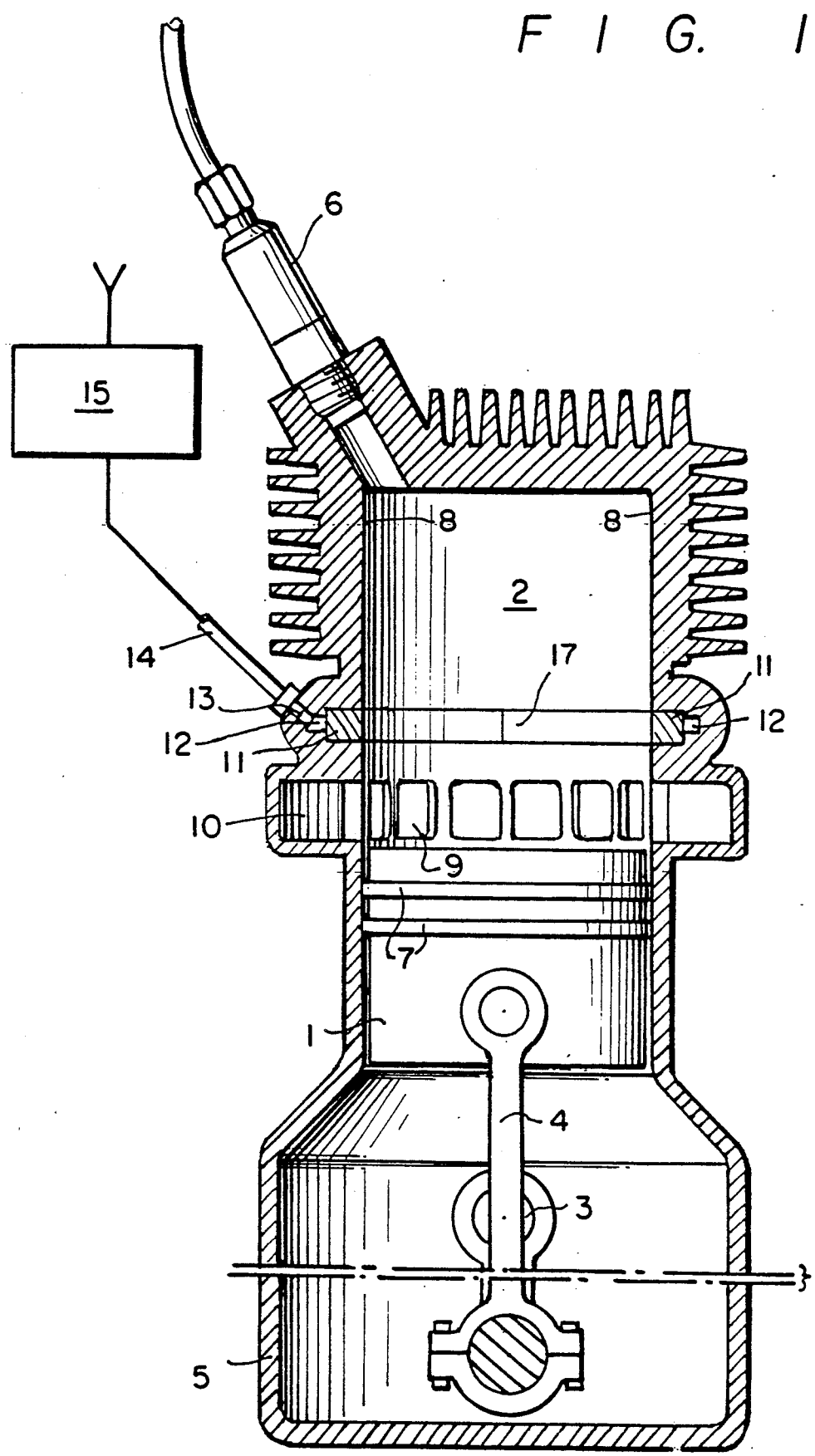
FIG. 1 is a cutaway view of a two cycle internal combustion engine in which the oil permeable ring is located slightly above the exhaust ports.

FIG. 1 shows a piston 1 located at bottom dead center in a cylinder 2. Piston 1 moves up and down inside cylinder 2 when crankshaft 3 rotates and forces connecting rod 4 to move piston 1 up and down. Fuel is injected into the cylinder via fuel injector 6. The inside of the cylinder wall 8 is lubricated by oil which flows from oil pressurizing means 15, through oil supply line 14, through oil connecting channel 13, and into annular oil supply channel 12. Oil from the annular oil supply channel 12 in turn passes through oil permeable ring 11 to the inside surface of oil permeable ring 11. From there, piston ring 7 of piston 1 distributes the oil over the inside surface of cylinder wall 8 when the piston moves up to top dead center (TDC).

FIG. 1 shows an embodiment of the invention in which the oil permeable ring 11 is located slightly above exhaust ports 9. These exhaust ports 9 are located slightly above the top of the piston when the piston is in its bottom dead center (BDC) position. Exhaust gases from the cylinder move through exhaust ports 9 and exit through exhaust manifold 10.

Figure 2:
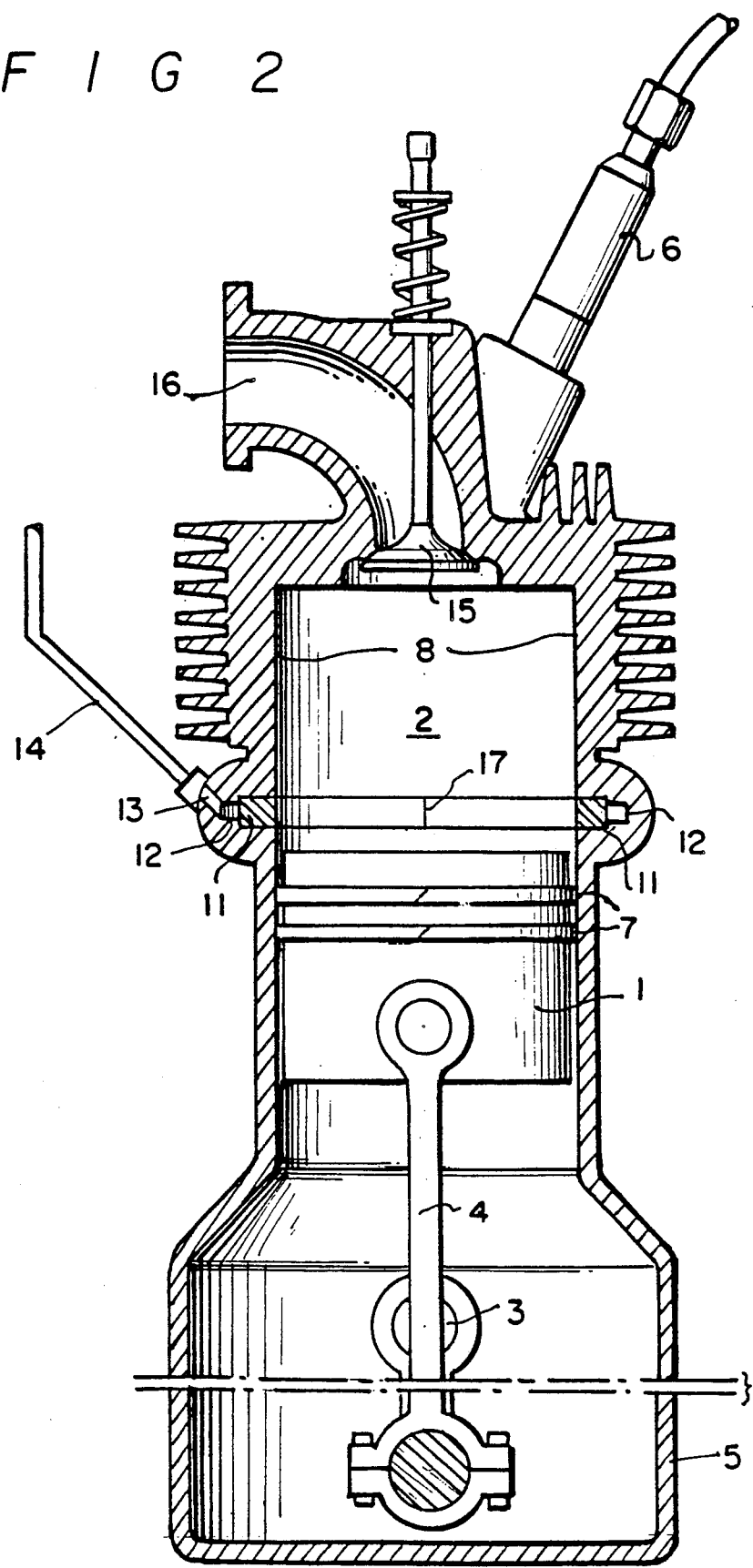
FIG. 2 is a cutaway view of oil permeable ring being used in a two cycle internal combustion engine where the exhaust valve is located at the top of the cylinder.

FIG. 2 shows a similar use of the oil permeable ring 11 in an internal combustion engine with an exhaust valve. FIG. 2 shows the oil permeable ring 11 located only slightly above bottom dead center (BDC) of piston 1. Rather than having exhaust ports located low in the cylinder, the engine of FIG. 2 has an exhaust port 16 which is located near the top of the cylinder. Exhaust valve 15 opens to allow exhaust gases to exit the cylinder through the exhaust port 16.

Figure 3:
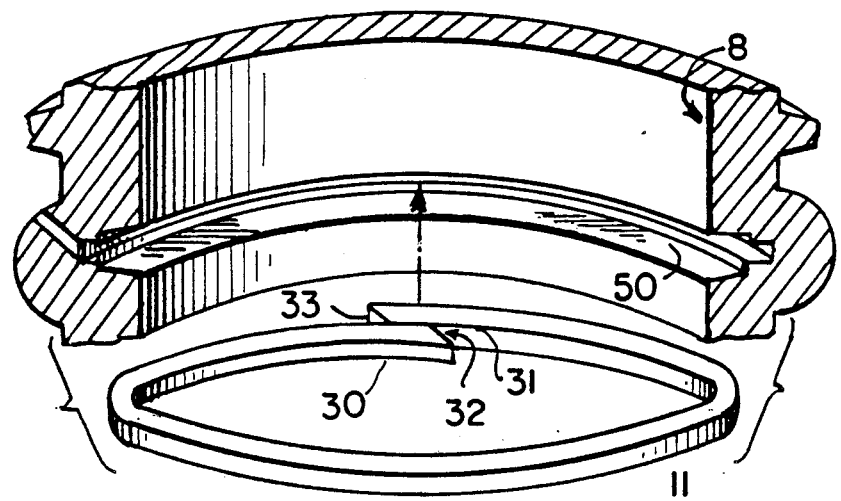
FIG. 3 shows the oil permeable ring coiled so that it can be placed inside the cylinder and installed into a groove in the cylinder wall.

The oil permeable ring is installed in annular groove 50 in the inside wall of the cylinder as shown in FIG. 3. First, the oil ring is coiled so that its coiled diameter is less than the inside diameter of the cylinder. The coiled ring is then placed inside the cylinder so that one end 31 of the ring is placed in groove 50 on the inside of cylinder wall 8. With this end 31 of the ring held in place, the remainder of the ring is fitted into the groove until the opposite end 30 of the ring meets with the first end 31.

Figure 5:
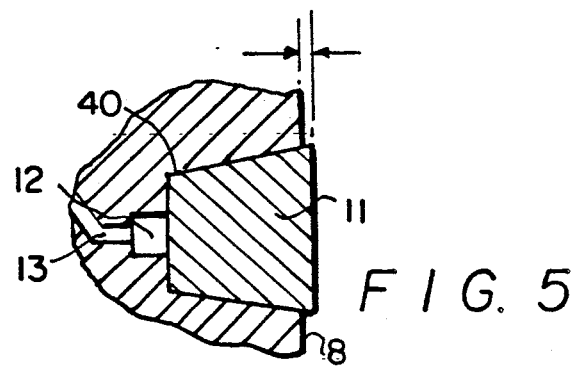
FIG. 5 is an expanded view of the crosssection of the oil permeable ring located in the cylinder wall before the cylinder wall has been honed.

A cross-section of the oil ring in the cylinder wall is shown in FIG. 5. Oil ring 11 creates a tight friction fit between itself and cylinder wall 8 at boundary 40. Also, the oil supply channel 12 is created when oil ring 11 is inserted as shown between oil supply channel 12 and the inside of the cylinder wall 8. The friction-fitted boundary 40 ensures that the only flow of oil from the oil supply channel 12 to the inside of the cylinder wall occurs through the oil permeable ring 11. Note that groove 50 has a slight wedge shape. The wedge shape is exaggerated in FIGS. 5 and 6 to be apparent from the drawings. The slight wedge shape facilitates pressure fitting the oil ring into groove 50.

The two end faces of the oil ring 32 and 33 also receive a tight fit. Accordingly, oil does not flow freely from the annular oil supply channel 12 to the inside of the cylinder through this end-face joint. In order to facilitate the forcing of the second end 30 into its final position, the end faces of the oil porous ring 32 and 33 may take on various shapes.

Figure 4:
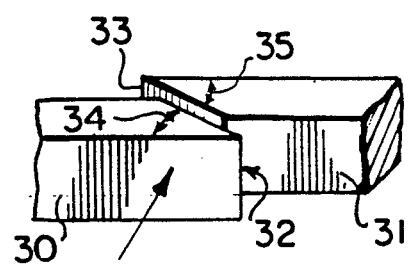
FIG. 4 shows an embodiment of the oil permeable ring with abutting ends.

One such shape with a low insertion force is shown in FIG. 5. This shape of ends 30 and 31 result in a low insertion force because angle 34 is greater than 90°. Its corresponding angle 35, which is approximately 90 degrees minus the angle 34, is small. Insertion of the second end 30 into groove 50 is therefore facilitated due to low angle 35. The oil ring shown in FIG. 4 creates a joint which is depicted on FIGS. 1 and 2 as reference 17.

Figure 6:
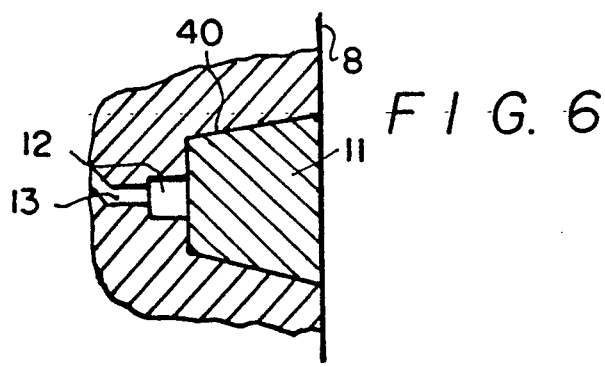
FIG. 6 is an expanded view of the oil permeable ring of FIG. 5 after the oil permeable ring and cylinder wall have been honed.

After the oil permeable ring is force fit into position in groove 50, it is apparent from FIG. 5 that the inside surface of the oil ring is not flush with the inside surface of cylinder wall 8. Accordingly, both oil ring 11 and the inside of the cylinder wall are honed. FIG. 6 shows the honed oil ring installed in groove 50. The inside of the cylinder wall 8 and the oil permeable ring 11 are completely flush.

Flow of a fluid through a permeable material is governed by Darcy's equation as shown below:

$$V = \frac{-k}{y} \frac{dP}{dL}$$

The V in the above equation is the desired flow velocity; the k in the above equation is the permeability of the material; the y in the above equation is the viscosity of the fluid; and the dP/dL is the pressure gradient across the material. Although the precise flow velocity will depend on different design considerations, it is clear that the oil ring must be permeable.

Sintered metals and porous ceramics are suitable materials from which to make the ring. In the alternative, cast rings comprising at least two mixed materials are used. After such a ring is cast, it is chemically treated and/or heat treated to remove one of the materials. The remaining voids render the ring both porous and permeable.

For example, the ring may be made of alloys of tungsten carbide, molybdenum, platinum, nickel, and boron. The ring may also be made of cast-iron with a high percentage of manganese such that the porosity of the resulting ring would be approximately 2% to 20%. Porous ferrous materials with approximately 1.25% phosphorous and 0.5% to 1% carbon may also be used. Some of the pores in the porous material must, of course, be connected so that the ring is permeable and so that oil can flow all the way through the ring.

Optimally, pore size should be kept below 10 microns so that grit material in the oil does not clog the pores in the ring. Note, however that the constant flow of oil from the pressurized annular oil supply channel 12 serves to keep the pores in the ring open and free of grit.

The coefficient of thermal expansion of the ring is at least as large as the coefficient of thermal expansion of the material from which the cylinder itself is made. If the coefficient of thermal expansion of the ring is slightly greater than that of the cylinder wall, the ring will expand into groove 50 as the engine heats up. Accordingly, the tight pressure fit between the ring and the groove will be maintained.

Figure 7:
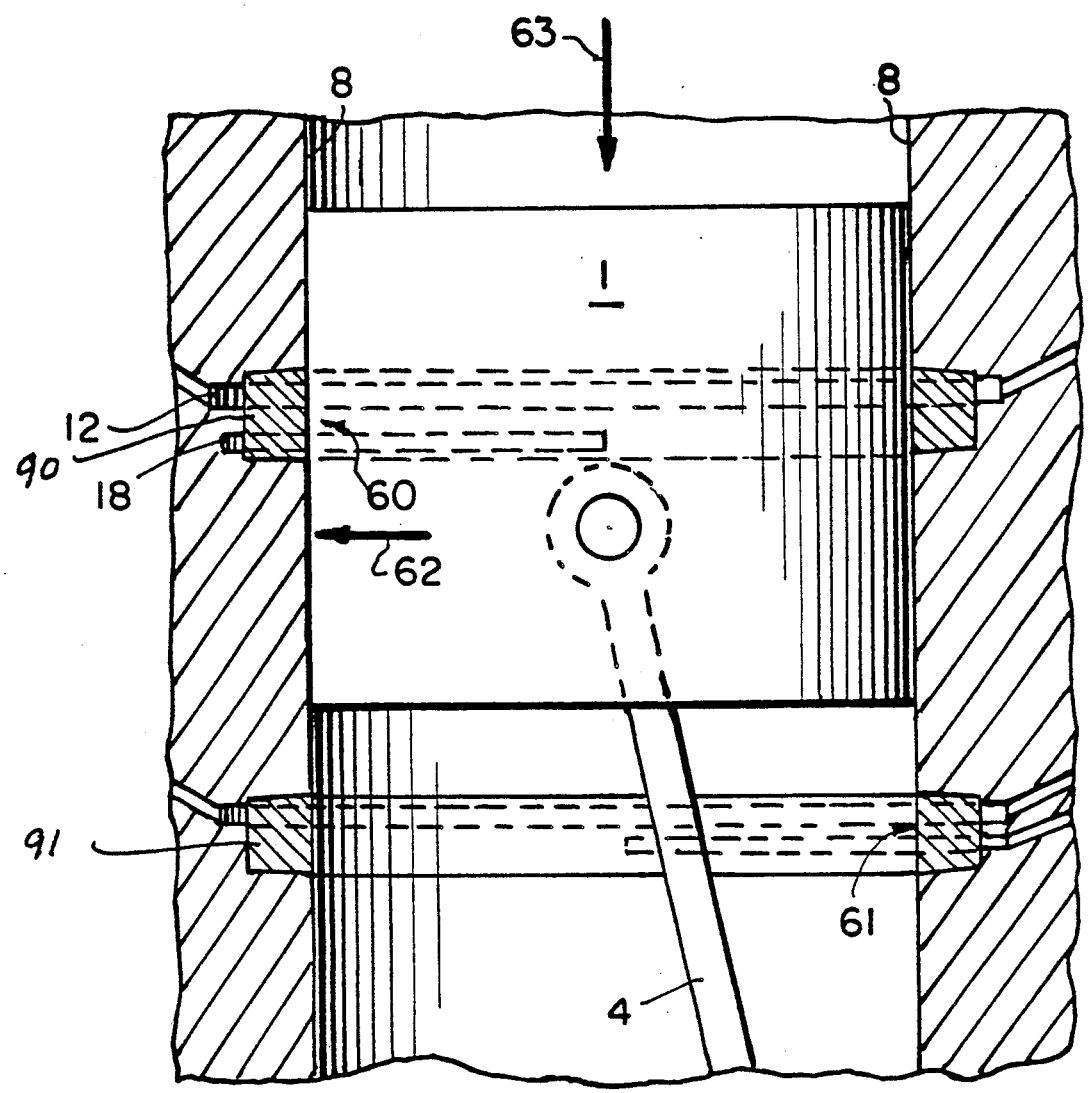
FIG. 7 is a cutaway schematic view of a piston in a cylinder showing the major thrust area, the minor thrust area, and a second annular oil supply channel in addition to the original annular oil supply channel.

If certain parts of the circumference of the cylinder wall are desired to be lubricated more than others, a second oil supply channel may be used to provide special lubrication to the part of the cylinder wall. FIG. 7 shows an annular groove which is shaped so that a second oil supply channel 18 is created. Both the original oil supply channel 12 and the second oil supply channel 18 are formed when the permeable ring 11 is fit into groove 50. The second oil supply channel 18 contains higher pressure oil than the original oil supply channel 12 so that the portion of the ring associated with the second oil supply channel 18 releases more oil. In the embodiment shown in FIG. 7, second oil supply channel 18 extends only over a portion of the circumference of the cylinder. A dedicated oil supply line then supplies the localized portion of the cylinder circumference with a dedicated supply of oil.

As shown in FIG. 7, two oil rings are employed in the preferred embodiment. An upper oil ring 90 is employed at the top of the cylinder in the vicinity of the "major thrust area" and a lower oil ring 91 is employed toward the bottom of the cylinder in the vicinity of the "minor thrust area" FIG. 7 shows the relationship between combustion pressure 63, side thrust 62, the connecting rod 4, the major thrust area 60, and the minor thrust area 61. Because the major thrust area is a location of major friction loading between the piston and the inside of the cylinder wall during the downward power stroke, the upper oil permeable ring provides special localized lubrication of the major thrust area. Because the minor thrust area is also a location of friction at the bottom of the stroke when the piston begins to move upward, the lower oil permeable ring provides special lubrication to the minor thrust area.

While this invention has been disclosed in connection with the above described embodiments, it is to be understood that there will be other embodiments which fall within the spirit and scope of the invention as defined by the following claims.

I claim:

1. A lubricating assembly for supplying a lubricant from a lubricant supply channel to the inside of a cylinder wall, the cylinder wall containing a piston which moves between a top dead center position and a bottom dead center position, a permeable ring being located in an annular groove in the cylinder wall such that the lubricant supply channel is formed between the annular groove and the ring, the ring being located between the top dead center position of the piston and the bottom dead center position of the piston.

2. The lubricating assembly of claim 1 wherein the permeable ring has a cylindrical inside surface, the inside surface having a diameter equal to the inside diameter of the cylinder wall, the inside surface of the cylinder wall and the inside surface of the permeable ring forming a single cylindrical surface.

3. The lubricating assembly of claim 1 further comprising a least one connecting channel for supplying lubricant into the lubricant supply channel.

4. The lubricating assembly of claim 1 wherein the permeable ring is force fit into the annular groove such that a tight seal is formed between the annular groove and the permeable ring.

5. The lubricating assembly of claim 1 wherein the piston includes at least one piston ring for engaging the cylinder wall, the permeable ring being located between the position of said at least one piston ring when the piston is at said bottom dead center position and the position of said at least one piston ring when the piston is at said bottom dead center.

6. The lubricating assembly of claim 1 wherein the annular groove has boundary walls dimensioned for forming a friction fit with the permeable ring, the boundary walls being tapered so that annular groove is widest at the surface of the cylinder wall.

7. The lubricating assembly of claim 1 wherein said permeable ring is a split ring such that the ring has a first end and a second end, each end having an abutment surface which engage to form a tight seal.

8. The lubricating assembly of claim 7 wherein said abutting surfaces are planar.

9. The lubricating assembly of claim 8 wherein said abutting surfaces lie in a plane containing the axis of the ring.

10. The lubricating assembly of claim 8 wherein the ring has a radius which intersects the abutting surfaces, the plane of said abutting surfaces lying parallel to the axis of the ring, the intersection of the abutting surface and the radius forming an acute angle.

11. The lubricating assembly of claim 8 wherein said abutting surfaces lie in a plane which intersects the axis of the ring at an angle.

12. The lubricating assembly of claim 1 wherein said cylinder wall has a major and a minor thrust area and said permeable ring intersects said major thrust area.

13. The lubricating assembly of claim 12 further comprising a second permeable ring located in a second annular groove, said second permeable ring intersecting said minor thrust area.

14. The lubricating assembly of claim 1 wherein said annular groove is formed such that at least one other lubricant supply channel is formed when said permeable ring is located in the annular groove, the at least one other lubricant supply channel extending only a portion of the way around the circumference of the cylinder.

15. The lubricating assembly of claim 1 wherein one of said at least one other lubricant supply channel contains lubricant at a higher pressure than the other lubricant supply channel.

16. The lubricating assembly of claim 1 wherein said permeable ring is made of a porous sintered metal.

17. The lubricating assembly of claim 1 wherein said permeable ring is made of a porous ceramic.

18. The lubricating assembly of claim 1 wherein said permeable ring is a cast ferrous ring.

19. A method for installing a split ring into an annular groove in the inside of a cylinder wall, the cylinder wall having an inside diameter, the split ring having an outside diameter, the split ring having a split which forms first and second ends of the split ring, the method comprising the steps of:
(a) coiling the split ring so that its outside diameter is less than the inside diameter of the cylinder wall; and
(b) placing the coiled split ring into the cylinder; and
(c) uncoiling the split ring into the annular groove.

20. The method of claim 19 wherein step (b) comprises fitting the first end of the split ring into the groove.

21. The method of claim 20 wherein step (c) comprises uncoiling the split ring into the annular groove until the second end is fit into the groove.

22. The method of claim 21 wherein the split ring is force fit into the groove to form a tight seal with the cylinder wall.

23. The method of claim 20 further comprising the step of honing the cylinder wall and the split ring to be flush with each other so that the honed cylinder wall and honed split ring each have the same inside diameter.

24. The method of claim 23 wherein the inside diameter of the split ring prior to honing is smaller than the inside diameter of the cylinder wall prior to honing.

25. A method of lubricating an internal combustion engine of the type having a cylinder wall and a piston, the piston reciprocally operating in the cylinder between a bottom dead center position and a top dead center position such that the pressure inside said cylinder varies between a maximum pressure to a minimum pressure, a permeable ring being located in an annular groove in the cylinder wall such that a lubricant supply channel is formed between the annular groove and the ring, the ring being located between the top dead center position and the bottom dead center position, comprising the steps of:
supplying lubricant to said lubricant supply channel at a pressure at least equal to said minimum pressure inside the cylinder.

26. The method of claim 25 wherein the step of supplying lubricant also involves increasing said pressure of said lubricant when more lubrication of the cylinder wall is desired.

* * * * *